United States Patent [19]
Tammi

[11] 3,983,378
[45] Sept. 28, 1976

[54] METHOD AND APPARATUS FOR MEASURING TAXI FARES

[75] Inventor: Tapio A. Tammi, Oulu, Finland

[73] Assignee: Kajaani Oy, Elektroniika, Oulu, Finland

[22] Filed: Oct. 1, 1974

[21] Appl. No.: 511,009

Related U.S. Application Data

[63] Continuation-in-part of Ser. No. 455,936, March 28, 1974.

[30] Foreign Application Priority Data

Mar. 30, 1973 Finland.................................. 988/73

[52] U.S. Cl............................ 235/151.32; 235/30 R
[51] Int. Cl.²........................................ G07B 13/00
[58] Field of Search................. 235/30 R, 30 A, 45, 235/150.2, 151.32, 150.3, 92 TC, 156; 346/15

[56] References Cited
UNITED STATES PATENTS

| | | | |
|---|---|---|---|
| 3,388,859 | 6/1968 | Kelch et al........................ | 235/30 R |
| 3,512,706 | 5/1970 | Bruce-Sanders.................. | 235/30 R |
| 3,764,782 | 10/1973 | Spouszus et al............... | 235/30 R X |
| 3,843,874 | 10/1974 | Kelch................................ | 235/45 X |
| 3,860,806 | 1/1975 | Fichter et al.................. | 235/30 R X |

Primary Examiner—Joseph F. Ruggiero
Attorney, Agent, or Firm—Burns, Doane, Swecker & Mathis

[57] ABSTRACT

Taxi vehicle fare measuring apparatus where impulses proportional to a waiting time and/or distance are supplied to a binary multiplier whose multiplication factor is selected by the driver at the time the taxi is hired. Several banks of binary switches are provided to calibrate the meter after its installation in accordance with a corresponding number of different established fare rate schedules. The preadjustment of the binary switches allows for accurate calibration of the meter taking into consideration such factors as speedometer gear ratios and tire wear, and the number of banks of binary switches allow for rate schedules to take in such variable factors as number of passengers, waiting time, or special fare rates for various geographical locations or time of day. The output pulses from the multiplier are supplied to a binary counter which controls an indicating device for producing a display of the fare. Additional banks of binary switches may be provided to preset the counter to a beginning condition corresponding in amount to a fixed charge.

10 Claims, 3 Drawing Figures

METHOD AND APPARATUS FOR MEASURING TAXI FARES

This application is a continuation-in-part of application Ser. No. 455,936, filed Mar. 28, 1974.

Fare meters most commonly used in taxis today are mechanical and large. Installed in different automobiles, they call for varying transmission ratios, as the speedometer cables of autos rotate different amounts over the same distance. Electric and electronic fare meters, see for example U.S. Pat. Nos. 3,157,352, 3,388,859, and 3,512,706 are also known. These meters offer noticeable advantages over mechanical meters, especially when it comes to setting or adjusting the meter to fit the vehicle and when rates change. The process of adjustment has not been complete as no one has found a complete solution according to which even one who is acquainted with electronics could easily adjust the meter. For example, interchangeable mechanical parts or interchangeable parts of electric circuits have been left in the meters, so that when, for example, rates change, one cannot always avoid waiting for parts.

In the published German patent application 2,263,914, the adjustment of the meter has been simplified by using a rather extensive semiconductor memory to allow the meter to be easily programmed to correspond with the rate basis of different countries. However, individual adjustment in the field remains rather difficult and calls for tools or changing of parts, or at least a reasonable knowledge of electronics. Furthermore, it remains characteristic of this and, in general, of the other meters mentioned above, that their structure is rather complex and demands a large amount of electronic components and thus their price is high.

In the older electronic fare meters mentioned above, the setting can be facilitated with soldered connections or plug bridges, but on the whole, the systems are very complicated and sufficient attention has not been given to a flexible possibility of carrying out the setting. For example, only partial digital programming of the multiplier circuits has been carried out; in the present invention, digital programming is included in all the essential quantities affecting the total fare and furthermore is carried out so that the coefficients of the different quantities can be determined independently.

In different countries, the basis for fare rates, which are usually officially determined, vary somewhat. In general, however, there is a certain basic rate, a rate based on the distance travelled and a rate based on waiting time; the total of these determines the total fare. Further, the rate can depend on the time of day and the number of people, e.g., Finland's 1, 2, 3, and H fare rates. In its details, the manner in which the basic rate, the rate depending on the distance travelled and the waiting time rate are combined varies in different countries. However, it seems to be a general principle that the waiting time rate is switched on when the vehicle is either stopped or moving at a sufficiently slow pace.

In electric and electronic fare meters for the distance travelled rate, a transducer is connected with the speedometer cable. The transducer gives an electric impulse frequency depending on the speed which, by integrating, yields the impulse amount proportional to the distance. For the waiting time rate, an electric oscillator that gives a standard frequency is used. In U.S. Pat. Nos. 3,157,352 and 3,388,859, both operate on a principle according to which the impulse frequency corresponding to the distance travelled and depending on the speed and the waiting time fare related impulse frequency, are compared with each other and the larger frequency of the two is chosen to feed the calculation and registration apparatus further connected with the meters. In the U.S. Pat. No. 3,512,706, impulse frequencies are associated with the distance travelled and the waiting time, with, however, a modification on the abovementioned meters in that the access of time impulses to the counter is prevented when distance impulses come in — in other words, when the vehicle is in motion.

A main object of this invention is to create a novel fare meter that is simple and inexpensive to construct, and in addition, is easy to install in individual vehicles according to varying fare rate structures.

Another object of the invention is to provide a novel taximeter employing digital multiplier circuits that transform all the quantities affecting the total fare into the proper mutual relation with, on the one hand, a sufficiently large dynamic operating range and, on the other hand, with switches that are easily adjusted which determine the multiplication factor as called for by the setting of the fare meter. In the preferred embodiment, no tools are needed in making the setting.

In the described embodiment, the binary switches are positioned so that for setting to the individual vehicle or when rates change, one can easily reach these switches through an access opening in the bottom of the meter. No special tools are needed for setting the switches and the owner can make the adjustments following simple instructions and the access opening is sealed by governmental authorities.

These and other objects will become more fully apparent from the claims and from the description as it proceeds in conjunction with the appended drawings wherein:

Figure 1:
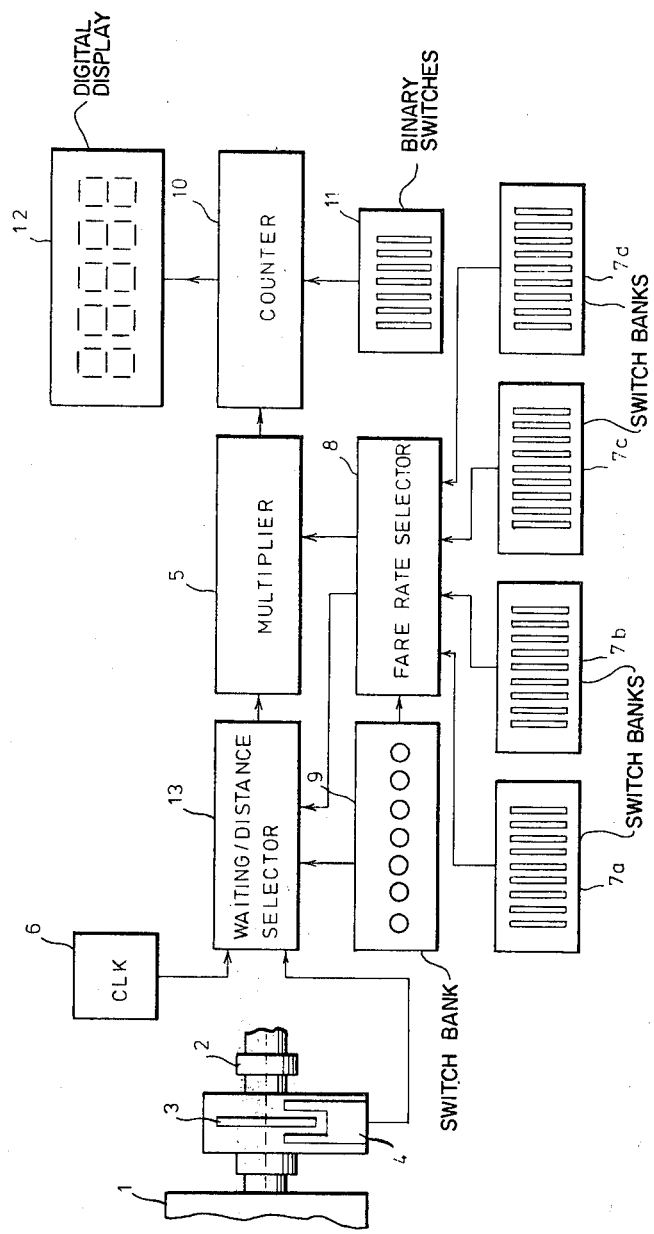
FIG. 1 is a block diagram showing the fare meter according to the present invention.

Electronic components shown in the drawings are commercially available and familiar to those skilled in the art, and it does not belong to the scope of this disclosure to describe them individually. The purpose of all essential components, such as they are used in the circuits of the present taximeter, however, will be explained below. It should be mentioned, further, that in the drawings, R relates to resistors, C to capacitors, Q to transistors, IC to integrated circuits, and D to diodes.

To obtain an amount of impulses, the number of which is proportional to the distance travelled, impulse disc 3 has been situated between speedometer 1 and speedometer cable 2. This disc revolves in slotted optical limit switch 4 and chops the light beam from one prong as seen by the photo-sensitive element on the other prong. This is a well known and proven technique using a commercially available optical switch.

The electronic impulses thus obtained are fed by a connecting wire as one input to the waiting/distance selector 13. The pulses from clock 6, which is a fixed frequency electronic oscillator, are also fed to the selector 13. Selector 13 can be set to a waiting rate by manual operation of a button 0 situated in switch 9 on the front panel of the meter. By manual operation of another button 1, 2, 3, or H in switch 9, a series of electrical pulses will be applied as one input to binary multiplier 5 which are related to use of the taxi vehicle and which are derived from either the optical transducer 4 or the clock 6.

Multiplier 5 may consist of two series connected six bit binary counters having as one input the pulses from the waiting/distance selector 13, as discussed above. The multiplication factor is applied as the other input by connecting a logical "0" or logical "1" to the various counting stages in a manner well known in the electronic art. The logic state of each input determines how many pulses from selector 13 are required to produce one output pulse and by this procedure the multiplication factor of the binary multiplier is controlled.

In the described embodiment, provisions are made to calibrate the fare meter in accordance with four different official rate schedules. To provide the appropriate multiplication factor, four different banks of manually operable switch contacts 7a, 7b, 7c, and 7d, are located so that they may be set and sealed. The setting of the correct logic state of each rate authorized by the official fare schedule in the geographical area in which the taxi is to operate is performed by switch bands 7a, 7b, 7c, and 7d. Each switch bank 7a, 7b, 7c, and 7d is used for each different fare rate. The fare rate applied by the meter is determined by binary values applied to the rate inputs of binary multiplier 5. The need for several different multiplication factors is owing to various fare rates legally required in the official fare rate schedule. Obviously, the number of switch banks 7 can be increased or decreased according to the sophistication of the fare rate schedule.

Multiplier 5 in the illustrated embodiment is a counter which completes one cyle upon receipt of 4096 pulses. The selected binary switch bank 7 will preset the multiplier 5 so that any number from between 1 and 4095 of pulses received by the other input signal channel from the waiting/distance selector 13 will produce an output pulse. The multiplication factor of the multiplier is thus X/4096. After converting X to a binary number, positions of corresponding switches in each bank 7a, 7b, 7c, or 7d can be calculated. In addition, the vehicle can be driven and any adjustments easily made for precise calibration without the need for substitution of any parts.

In the illustrated embodiment of the invention, it happens that only 9 bits out of the 12 bit input to multiplier 5 are in use, because the necessary dynamic operating range and accuracy does not require all the 12 channels to be modified. Switch banks 7 thus consist only of 9 switches each as illustrated, and the multiplication factor can be varied between 1/4096 and 511/4096. For further information about binary rate multipliers of this type, reference is made to Kohonen, T: "Digital Circuits and Devices," p. 166, Prentice Hall 1972, and Parsons, B: SN 7497, "Binary Rate Multiplier," Texas Instruments Application Note, Sept. 1970.

Figure 2:
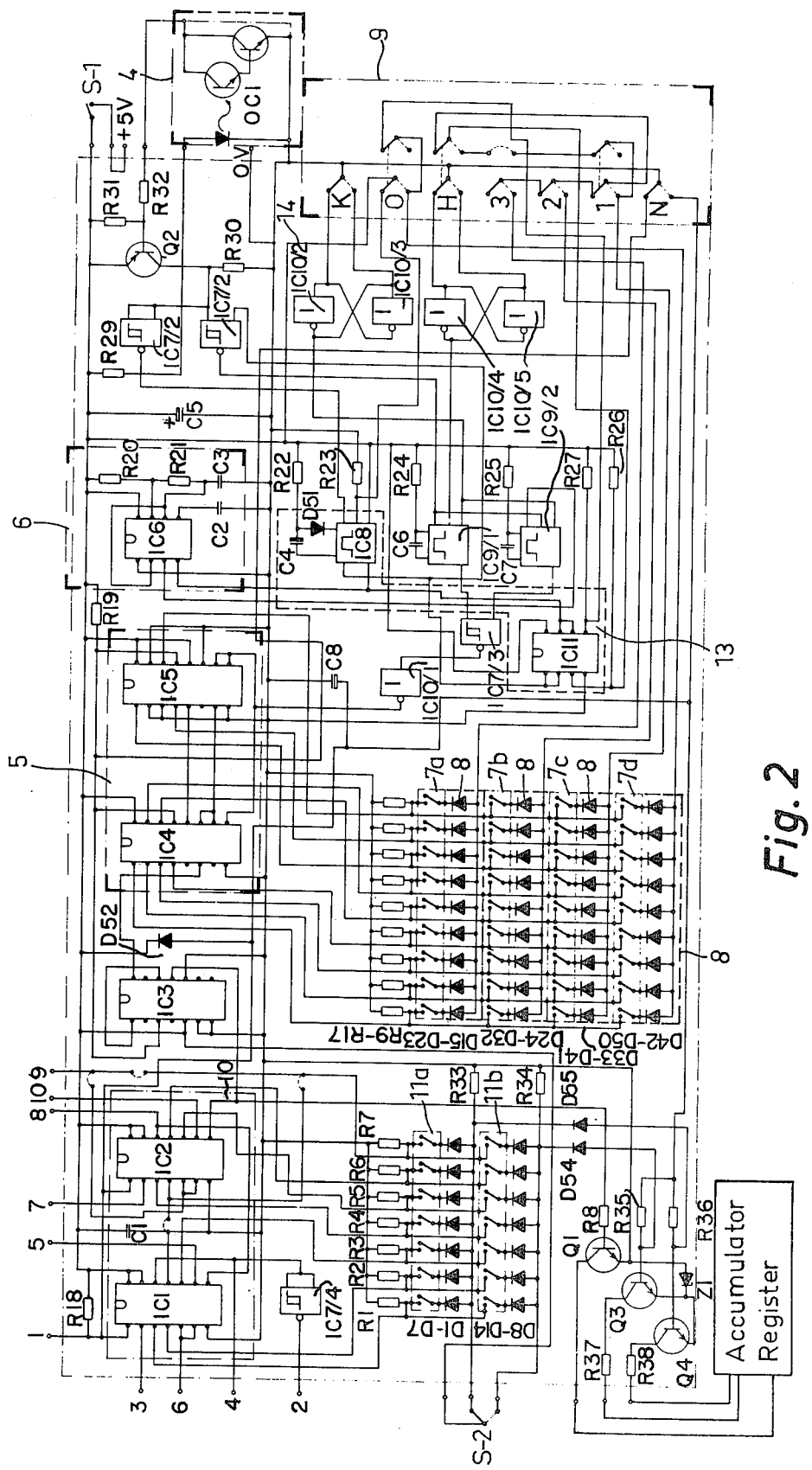
FIG. 2 is a detailed schematic diagram of the taximeter of FIG. 1, showing all electronic components except those belonging to the digital display.

To facilitate connection between the multiplier 5 and the switch banks, fare rate selector 8 provides the necessary interface. The fare rate selector 8 may consist of a diode matrix as illustrated in FIG. 2. Switch bank 9 includes a switch contact for each fare rate that is selected by the taxi driver and its setting determines which switch bank 7a, 7b, 7c, or 7d is connected to control multiplier 5.

From multiplier 5 impulses are transmitted to counter 10 and digital display 12, as illustrated in FIG. 1. Binary switches 11a and 11b (see also FIG. 2) enable a basic charge that is preadjusted to be added by setting counter 10 at the beginning of the drive to a predetermined value. If several different basic charges are required by the official rate schedule, a corresponding number of banks of switches 11 can be provided.

Emphasis shall be made in the difference between the driver operated switch 9 and switch banks 7 and 11. Switch 9 may be an ordinary rotary or push button switch which can select the appropriate fare rates in the course of each drive as determined, for example, by the time of day, number of passengers, etc. and placed in the waiting position, or hold position when the passenger is about to disembark and finally moved to the reset position after the fare is paid. Switch banks 7 and 11, on the other hand, may be tiny binary (two position) switches which are preferably situated on the printed circuit board and are manually adjustable. Switches 7 and 11 are preadjusted and are adapted to be sealed after calibration of the meter with the vehicle and prevailing official fare rate schedules; readjustment is needed only in the case of rate or perhaps tire size change.

Referring now to FIG. 2, switch 9 is shown at the lower right-hand side of the drawing and is driver operated for setting four distance fare rates (1, 2, 3, and H) and one waiting rate (0). Additional switch positions are provided in switch 9 for resetting the meter to zero (N) and for stopping the meter (K) which holds the final fare in display. Switch S1 at the upper right-hand side of FIG. 2 provides the overall on/off function of the meter. Either of two basic charges set by switch banks 11a and 11b may be selected by switch S2 located on the left-hand side of the drawing as discussed above.

Transducer 4 is comprised of a slotted disc mounted on the speedometer cable and a beam of light from a light emitting diode is chopped and received by phototransistor QC1 shown at the upper right-hand side of FIG. 2. The frequency of chopping and therefore the pulse frequency is proportional to the speed of the vehicle. Pulses from transducer 4 are amplified by transistor Q2 and fed to the inputs of two Schmitt triggers IC7/1 and IC7/2. The pulses from the output of IC7/2 are applied to monostable multivibrators IC9/1 and IC9/2, from which narrow output pulses are obtained, one pulse at the rising edge of the input pulse from IC9/1 and one at the falling edge from IC9/2. These pulses are summed by IC7/3, so that double the input frequency is obtained, for a purpose explained below. This composite signal is inverted by IC19/1.

The inverted pulses are applied to multiplier 5 which comprises two six bit binary rate multipliers IC4 and IC5. Multiplier 5 performs the multiplication of the amount of input pulses by a factor corresponding to the fare rate.

This multiplication factor is preset with binary switch banks 7a, 7b, 7c, and 7d. These switches have been connected in parallel with the aid of fare rate selector 8 shown in FIG. 1 which comprises diode matrix D15–D50 of FIG. 2. Selection of the correct bank is performed by the setting of switch 9. For example, when the distance fare rate 1 is desired, operation of the corresponding contact in switch 9 connects the supply voltage, i.e., logical "1" to the mutually connected anodes of diodes D33–D41, the cathodes of which are connected to individual switches in bank 7c. In connecting this voltage, peripheral driver IC11 is used. Other terminals of switch bank 7c have been connected to the rate input terminals of multiplier 5 in a specified order. The switches themselves are open or closed, according to the calculated positions corresponding to the multiplication factor. Switch bank 7c determines the multiplication factor of multiplier 5.

Similarly, as determined by fare rates 2, 3, and 0, switch banks 7b, 7a, and 7d will be connected respectively to set the multiplication factor of multiplier 5.

In accordance with fare rate practice in Finland, fare rate H is half of fare rate 1. When it is switched in, switch bank 7c will be connected to set the multiplication factor. Simultaneously, the operation of monostable multivibrator IC9/1 will be inhibited, so that only pulses from IC9/2 will be fed further. In consequence, only half the number of pulses, compared to the operation of other distance fare rates, will be obtained.

When the vehicle stops moving, or in practice, moves at a very slow speed, fare 0, the waiting fare, is switched in. This occurs for any position of switches in switch bank 9 for distance fare rates. This is achieved by applying the pulses from transducer 4, through Q2 and IC7/1, to the input of retriggerable monostable multivibrator IC8 and applying control signals from the outputs of IC8 to peripheral driver IC11. If the interval between subsequent input pulses is greater than the period of IC8, IC8 will return to its normal 10 state and cause IC11 to connect switch bank 7d in. This procedure is represented in FIG. 1 by the signal path between fare rate selector 8 and waiting/distance selector 13, and in FIG. 2, after peripheral driver IC11, by the connection of the lowest right-hand terminal of IC11 through switch 0 in switch bank 9 to the anodes of diodes 7d. When fare rate 0 is switched in, this signal path will be broken and the anodes of diodes 7d are directly connected to logical "1" through lead 14. When IC11 is in its normal state, also the clock 6 (see IC5 of FIG. 2) will be started. The clock pulses from IC6 are fed, after shaping by IC9/2, to multiplier 5. In accordance with the above, waiting/distance selector 13 comprises monostable multivibrator IC8, peripheral driver IC11, and the internal control logic of clock IC6. A commercially available timer circuit has been used for clock IC6, the frequency of which is determined by resistors R20, R21, and capacitor C3.

Figure 3:
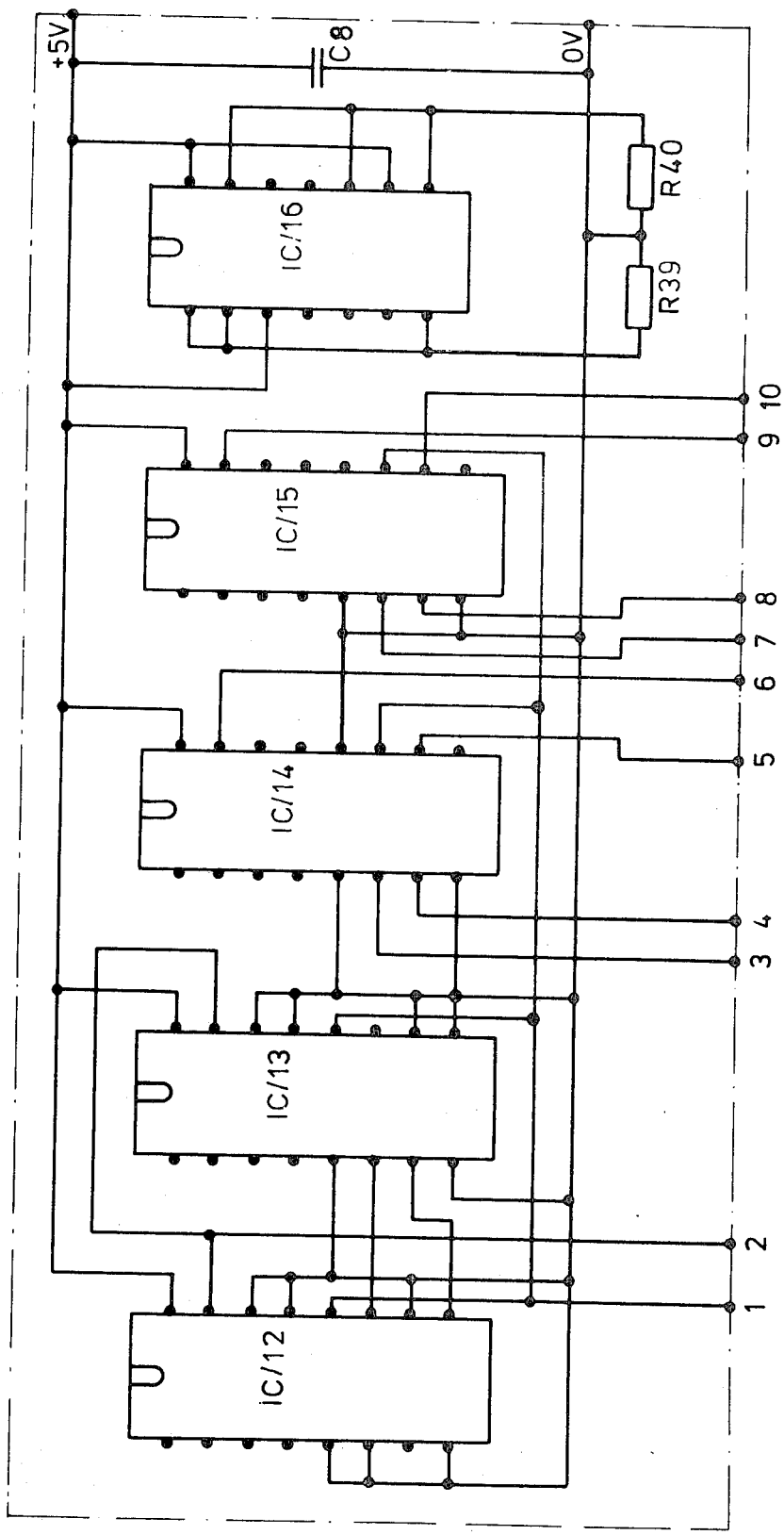
FIG. 3 is a diagram of the digital display.

Decade counter IC3 is used for the purposes of scaling and divides by 10 the output pulse frequency from multiplier 5 after which the pulses are fed to presettable counters IC1 and IC2. In counters IC1 and IC2, a basic charge, as determined by preadjustable switch bank 11a or 11b, is automatically set at the beginning of each fare haul. Counters IC1 and IC2 control the second (IC14) digit and third (IC15) digit of the display unit (as shown in FIG. 3). For interconnection, refer to the numbered terminals (shown as 1 to 10) which are common to FIGS. 2 and 3. Box IC14 and IC15 are decoder/drivers with seven segment displays. The two most significant digit packages IC12 and IC13 and similar to IC14 and IC15 with the addition of counters. The least significant digit IC16 has been permanently set to zero in the illustrated embodiment.

To obtain outputs for cumulative counters, transistors Q1, Q3 and Q4 are used. These outputs conform to Finnish practice; Q1 delivers the number of tenths of the monetary unit while Q3 and Q4 deliver the number of farepaying trips with a basic charge.

These totals may be stored in accumulator registers to provide information concerning total use of the vehicle.

With the design of the present invention, the quantities affecting the total fare can be made completely independent. In this fashion, one can take into consideration vehicle differences, the differences in the relation of the partial fares prevailing in different countries, differences between various monetary units, errors due to change in tire size, and changes called for when the partial rates change randomly in their mutual relationship even in the same locality. These preadjustments may be made merely by changing the position of the binary switches. For example, when rates change, by going on one trial journey, if necessary, for each rate or when the mutual relation between the different rates remains the same for only one rate, one can easily calculate the new positions of the switches by starting from the position of the switches during the trial journey and from the deviations from the correct values noted for the trial journey, then turn the switches to the positions thus calculated. At the same time, errors due to differences between vehicles have been corrected, and the meter is again ready for use.

The present invention may be embodied in other specific forms without departing from the spirit or essential characteristics thereof. The presently disclosed embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and intended to be covered by Letters Patent is:

1. A meter for measuring a fare in a taxi vehicle comprising:
   a binary multiplier having two signal input channels and a signal output channel;
   means for producing a series of electrical pulses related to use of the taxi vehicle connected to be applied to one signal input channel;
   a plurality of banks of binary switch means for preadjustment to different positions with each bank adjusted to calibrate the meter when operating in the taxi vehicle, wherein each bank of binary switch means comprises a plurality of two position switches manually operable for calibration of the meter for operation in a particular taxi vehicle as well as for calibration of the meter to correspond to a different approved fare rate schedule;
   a manually operable switch disposed for operation by the taxi driver each time the taxi is hired to connect a predetermined one of said banks of binary switch means to the other signal input channel to control said binary multiplier in accord with the approved selected fare rate schedule; and
   an indicating device connected to be responsive to the electrical pulses in the output signal channel for displaying the fare.

2. The meter of claim 1 wherein the two position switches are accessible only at the inside of the meter housing and adapted to be sealed after calibration of the meter.

3. The meter of claim 2 wherein said driver operable switch includes separate contacts for differing numbers of passengers being hauled and additional separate positions for holding a displayed fare, and for resetting to zero the indicating device.

4. The meter of claim 3 wherein:
said electrical pulse producing means includes circuitry for combining electrical pulses from two sources, one a fixed frequency source and the other producing pulses related to vehicle speed;
first circuit means for producing an output electrical pulse according to the rate of pulses received from which of the two sources has the higher frequency of pulses; and
second circuit means for changing the selected bank for controlling the multiplier signal supplied to the binary multiplier in response to the production of an output pulse from said first circuit means responsive to pulses from said fixed frequency source.

5. The meter of claim 4 further comprising a frequency divider circuit having its input connected to receive output signals from said multiplier and to produce output pulses that are supplied to said indicating device through a counter circuit; and means for introducing an output count to said counter circuit corresponding to a fixed charge in advance of the start of the taxi hire so that the correct total fare is supplied to said indicating device.

6. The meter of claim 5 further having an accumulator register for storing information concerning the total of the fares registered by said meter and a separate total of the fares registered according to each fixed charge.

7. A meter for measuring a fare in a taxi vehicle comprising:
a binary multiplier having two signal input channels and a signal output channel;
means for producing a series of electrical pulses related to use of the taxi vehicle connected to be applied to one signal input channel;
a plurality of banks or binary switch means for preadjustment to different positions with each bank adjusted to calibrate the meter when operating in the taxi vehicle to correspond to a different approved fare rate schedule;
a manually operable switch disposed for operation by the taxi driver each time the taxi is hired to connect a predetermined one of said banks of binary switch means to the other signal input channel to control said binary multiplier in accord with the approved selected fare rate schedule; and
an indicating device connected to be responsive to the electrical pulses in the output signal channel for displaying the fare,
said driver operable switch including separate contacts for differing numbers of passengers being hauled and additional separate positions for holding a displayed fare, and for resetting to zero the indicating device.

8. A meter for measuring a fare in a taxi vehicle comprising:
a binary multiplier having two signal input channels and a signal output channel;
means for producing a series of electrical pulses related to use of the taxi vehicle connected to be applied to one signal input channel;
a plurality of banks of binary switch means for preadjustment to different positions with each bank adjusted to calibrate the meter when operating in the taxi vehicle to correspond to a different approved fare rate schedule;
a manually operable switch disposed for operation by the taxi driver each time the taxi is hired to connect a predetermined one of said banks of binary switch means to the other signal input channel to control said binary multiplier in accord with the approved selected fare rate schedule; and
an indicating device connected to be responsive to the electrical pulses in the output signal channel for displaying the fare,
said electrical pulse producing means including circuitry for combining electrical pulses from two sources, one fixed frequency source and the other producing pulses related to vehicle speed;
first circuit means for producing an output electrical pulse according to the rate of pulses received from which of the two sources has the higher frequency of pulses; and
second circuit means for changing the selected bank for controlling the multiplier in response to the production of an output pulse from said first circuit means responsive to pulses from said fixed frequency source.

9. A meter for measuring a fare in a taxi vehicle comprising:
a binary multiplier having two signal input channels and a signal output channel;
means for producing a series of electrical pulses related to use of the taxi vehicle connected to be applied to one signal input channel;
a plurality of banks of binary switch means for preadjustment to different positions with each bank adjusted to calibrate the meter when operating in the taxi vehicle to correspond to a different approved fare rate schedule;
a manually operable switch disposed for operation by the taxi driver each time the taxi is hired to connect a predetermined one of said banks of binary switch means to the other signal input channel to control said binary multiplier in accord with the approved selected fare rate schedule;
an indicating device connected to be responsive to the electrical pulses in the output signal channel for displaying the fare, and
an accumulator register for storing information concerning the total of the fares registered by said meter and a separate total of the fares registered according to each fixed charge.

10. A method for measuring a fare in a taxi vehicle comprising:
providing an electronic multiplier having two input signal channels and one output signal channel with a counting circuit and display device connected to receive electrical pulses in the output signal channel;
generating a plurality of pulses, the number of which corresponds to the use of the taxi vehicle and applying said generated pulses to one input of said electronic multiplier;
providing a plurality of banks of binary switches preadjustable to different positions;
adjusting the binary switches in each bank during a calibration procedure so that each bank corresponds to a different approved fare rate schedule;
providing a multiple position switch located to be operated by the taxi vehicle driver each time the vehicle is hired for selecting one of said banks of preset binary switches according to the approved fare rate schedule;

supplying the electrical signal from said selected bank of preset binary switches to the other input signal channel of said electronic multiplier, and presetting at the beginning of a taxi ride a predetermined fixed fare charge by supplying an initial count to said counting circuit corresponding in value to the fixed fare charge.

* * * * *